(12) United States Patent
Essiambre et al.

(10) Patent No.: US 7,474,860 B2
(45) Date of Patent: Jan. 6, 2009

(54) OPTIMUM SAMPLE SPACING IN OVER-SAMPLED MAXIMUM LIKELIHOOD SEQUENCE ESTIMATION RECEIVERS

(75) Inventors: Rene Jean Essiambre, Red Bank, NJ (US); Michael Rubsamen, Aachen (DE); Peter J. Winzer, Aberdeen, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 414 days.

(21) Appl. No.: 11/306,174

(22) Filed: Dec. 19, 2005

(65) Prior Publication Data
US 2007/0140706 A1    Jun. 21, 2007

(51) Int. Cl.
*H04B 10/06* (2006.01)
(52) U.S. Cl. .................... 398/202; 398/208; 398/209; 398/147; 398/148; 398/149; 398/158; 398/159; 398/210; 398/211; 398/213; 398/214; 375/341; 375/316; 375/317; 375/148; 375/350; 375/346; 375/232; 375/233
(58) Field of Classification Search ............. 398/202, 398/208, 209, 147, 148, 149, 158, 159, 210, 398/211, 213, 214; 375/316, 317, 232, 233, 375/148, 341, 346, 350
See application file for complete search history.

(56) References Cited

U.S. PATENT DOCUMENTS 7,110,683 B2 * 9/2006 Bessios .................. 398/208

2006/0013597 A1 * 1/2006 Crivelli et al. .............. 398/208
2006/0274861 A1 * 12/2006 Langenbach et al. ........ 375/341

OTHER PUBLICATIONS

H. F. Haunstein et al., "Principles for Electronic Equalization of Polarization-Mode Dispersion," J. Lightwave Technol., vol. 22, pp. 1169-1182, 2004.
F. Buchali et al., "Viterbi equalizer for mitigation of distortions from chromatic dispersion and PMD at 10 Gb/s," in Proc. Opt. Fiber Commun. Conf. (OFC), MF85, 2004.
A. Farbert et al., "Performance of a 10.7-Gb/s receiver with digital equalizer using maximum likelihood sequence estimation," Proc. Eur. Conf. Opt. Comm. (ECOC), 2004.
J. J. Lepley et al., "Excess penalty impairments of polarization shift keying transmission format in presence of ...," Electronics Lett., vol. 36, No. 8, pp. 736-737, 2000.
F. Buchali et al., "Correlation sensitive Viterbi equalization of 10 Gb/s signals in bandwidth limited receivers," Proc. Opt. Fiber Commun. Conf. (OFC), OFO2, 2005.

(Continued)

*Primary Examiner*—Hanh Phan

(57) ABSTRACT

In an over-sampled maximum-likelihood sequence estimation (MLSE) receiver system, the optimal sample spacing is determined for a variety of conditions. In an illustrative implementation, the system includes an optical filter for tightly filtering an incoming optical data signal with an on-off-keying (OOK) non-return-to-zero (NRZ) format, followed by an optical-to-electrical converter, an electrical filter, a sampler, and a MLSE receiver. The sampler samples the filtered electrical data signal twice each bit period with unequal sample spacings. For wide optical filtering bandwidths, the optimal sample spacing occurs at less than 50% of a bit period. For narrow bandwidths, the optimal sample instances occur closer to the maximum eye opening.

22 Claims, 3 Drawing Sheets

OTHER PUBLICATIONS

H. F. Haunstein et al., "Optimized Filtering for.Electronic Equalizers in the Presence of Chromatic Dispersion and PMD," Proc. Opt. Fiber Commun. Conf. (OFC), MF63, 2003.

P. J. Winzer, et al., "Coherent Crosstalk in Ultradense WDM Systems," J. Lightwave Technol., vol. 23, pp. 1734-1744, 2005.

* cited by examiner

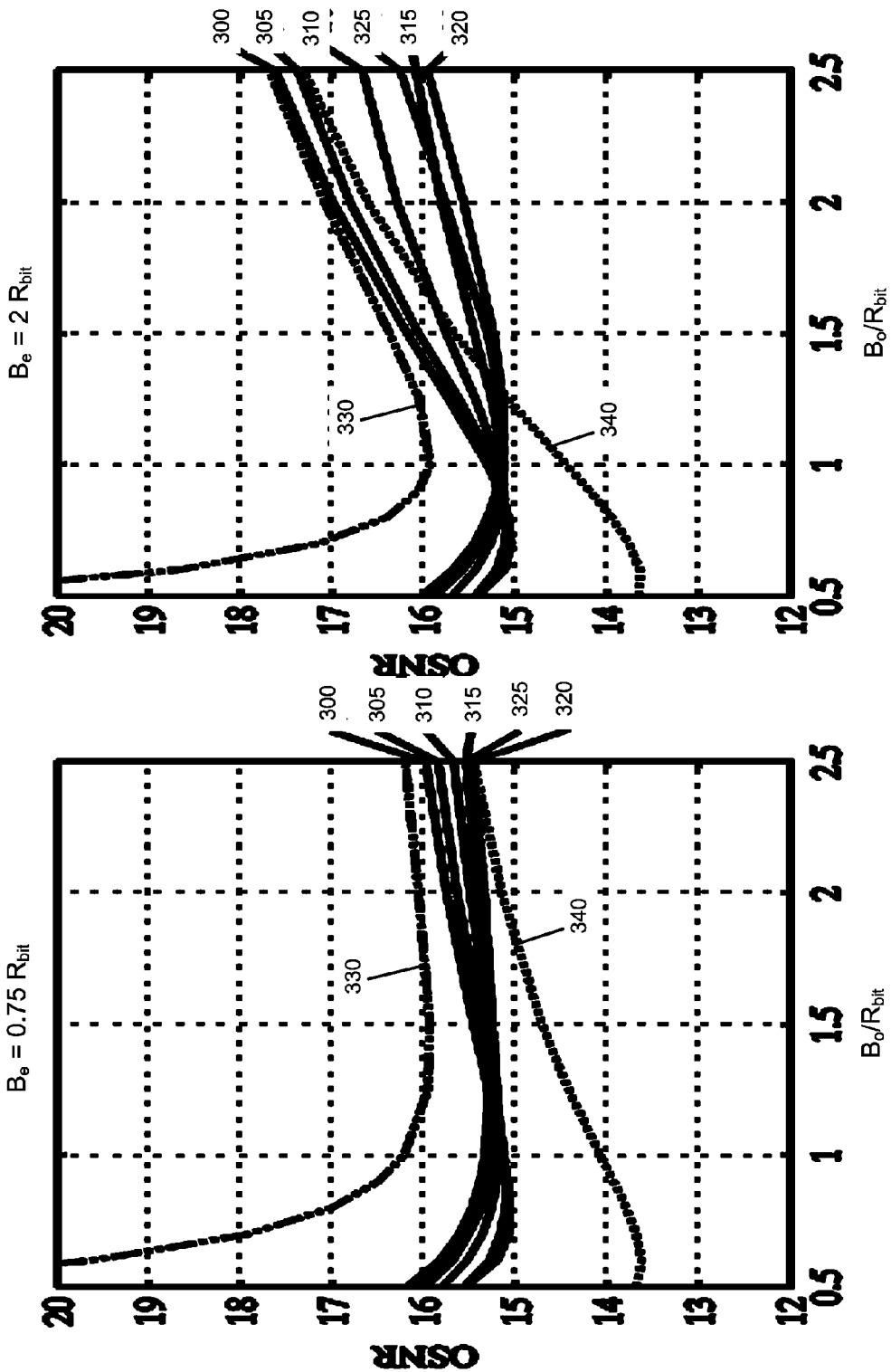

OPTIMUM SAMPLE SPACING IN OVER-SAMPLED MAXIMUM LIKELIHOOD SEQUENCE ESTIMATION RECEIVERS

FIELD OF THE INVENTION

The present invention relates to the field of high-speed optical data communications, and in particular, to the detection of signals using maximum likelihood sequence estimation.

BACKGROUND INFORMATION

Maximum likelihood sequence estimation (MLSE) receivers have been used in fiber optic communication systems operating at data rates up to 10 Gb/s to counteract signal distortions due to chromatic and polarization-mode dispersion. (See, e.g., H. F. Haunstein et al., "Principles for Electronic Equalization of Polarization-Mode Dispersion," J. Lightwave Technol., vol. 22, pp. 1169-1182, 2004; F. Buchali et al., "Viterbi equalizer for mitigation of distortions from chromatic dispersion and PMD at 10 Gb/s," in Proc. Opt. Fiber Commun. Conf. (OFC), MF85, 2004; A. Farbert et al., "Performance of a 10.7-Gb/s receiver with digital equalizer using maximum likelihood sequence estimation," Proc. European Conf. on Opt. Commun. (ECOC), p. Th4.1.5, 2004; and J. J. Lepley et al., "Excess penalty impairments of polarization shift keying transmission format in presence of polarization mode dispersion," IEEElectron. Lett., vol. 36, no. 8, pp. 736-737, 2000.)

MLSE has also been used to mitigate distortions due to narrow-band electrical filtering such as is typically used in receivers. (See, e.g., F. Buchali et al., "Correlation sensitive Viterbi equalization of 10 Gb/s signals in bandwidth limited receivers," Proc. Opt. Fiber Commun. Conf. (OFC), OFO2, 2005; and H. F. Haunstein et al., "Optimized Filtering for Electronic Equalizers in the Presence of Chromatic Dispersion and PMD," Proc. Opt. Fiber Commun. Conf. (OFC), MF63, 2003.)

The performance of receiver systems employing MLSE may be improved under certain conditions by over-sampling the received data signal and applying the MLSE algorithm to the increased number of samples.

SUMMARY OF THE INVENTION

In an exemplary embodiment, the present invention provides an optical communication receiver in which maximum likelihood sequence estimation (MLSE) is performed on an over-sampled received signal. In an aspect of the present invention, the optimal sample spacing is determined for various conditions.

BRIEF DESCRIPTION OF THE DRAWINGS

FIGS. 3A and 3B illustrate the performance of an exemplary receiver under different conditions for narrow and wide bandwidth electrical filtering, respectively.

DETAILED DESCRIPTION

Figure 1:
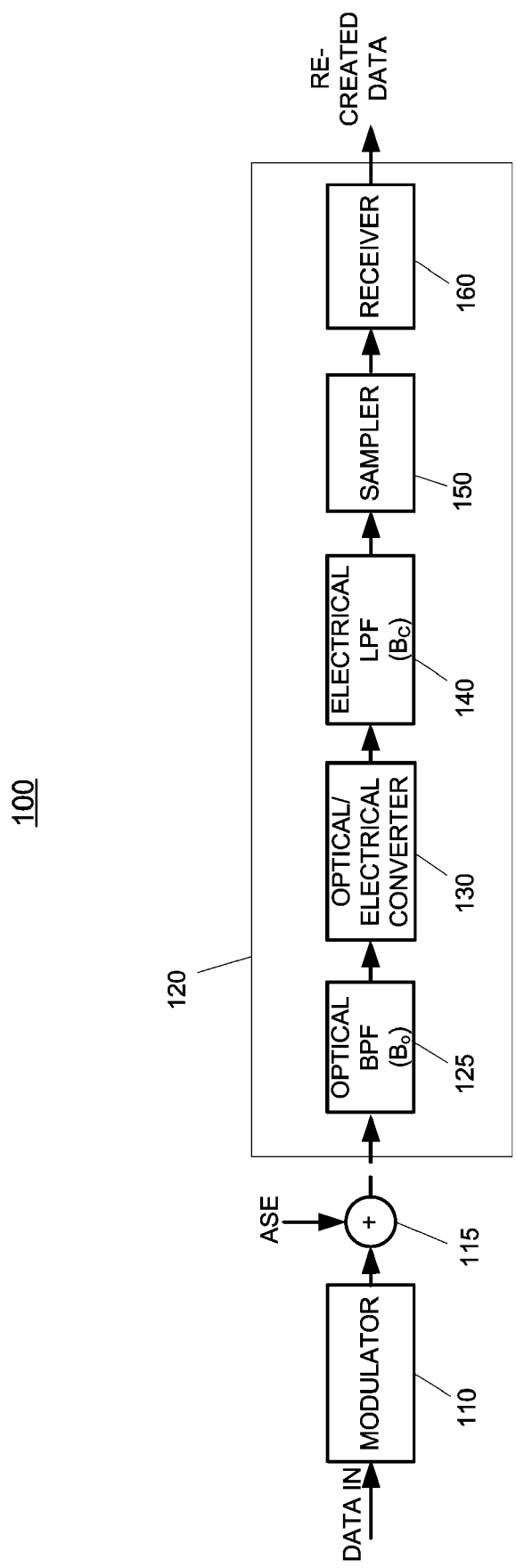
FIG. 1 is a schematic representation of a model of an optical communication system with an exemplary embodiment of a receiver in accordance with the present invention.

FIG. 1 is a schematic representation of a model of an exemplary optical communication system 100 with an exemplary embodiment of a receiver 120 in accordance with the present invention. The bit sequence to be transmitted, denoted â1, â2, . . . , ân, with $\hat{a}_i \in \{0, 1\}$ and with time index $i \in \{1, \ldots, n\}$, is modulated by a modulator 110. The modulator, may be, for example, a chirp-free Mach-Zehnder modulator producing a non-return-to-zero (NRZ) on-off-keying (OOK) signal. Other signal formats may also be used in conjunction with the present invention, including RZ and phase-modulated signals, among others.

The model used to illustrate the present embodiment assumes, for the sake of simplicity, a linear channel, in which case amplified spontaneous emission (ASE) noise is added at 115 from in-line optical amplification in both polarization modes carried by a single-mode optical fiber. The present invention applies equally to other optical channel models, including non-linear optical channels. For each polarization independently, the ASE noise can be modeled as additive, white, circularly symmetric complex Gaussian noise (AWGN).

At the receiver 120, the noisy signal is filtered by an optical bandpass filter 125 of bandwidth $B_o$, which can be implemented, for example, as a first or third-order Gaussian filter.

As a measure of the performance of the receiver 120, the optical-signal-to-noise ratio (OSNR) at the receiver 120 input that is required by the receiver for operation at a predefined bit error ratio (e.g., $10^{-3}$) can be used. The OSNR is defined as $P_s/(2N_{ASE}B_{ref})$, where $P_s$ is the optical signal power entering the receiver, $N_{ASE}$ is the ASE power spectral density per polarization, $B_{ref}$ is the reference bandwidth (e.g., 12.5 GHz), and the factor of 2 takes into account both ASE polarizations.

After the filter 125, the optical signal is provided to an optical-to-electrical converter 130, such as, for example, a square-law photodetector or a coherent receiver. The resultant electrical signal is filtered by a low-pass filter 140 of bandwidth $B_e$. The filter 140 can be implemented, for example, as a fifth-order Bessel filter.

Figure 2B:
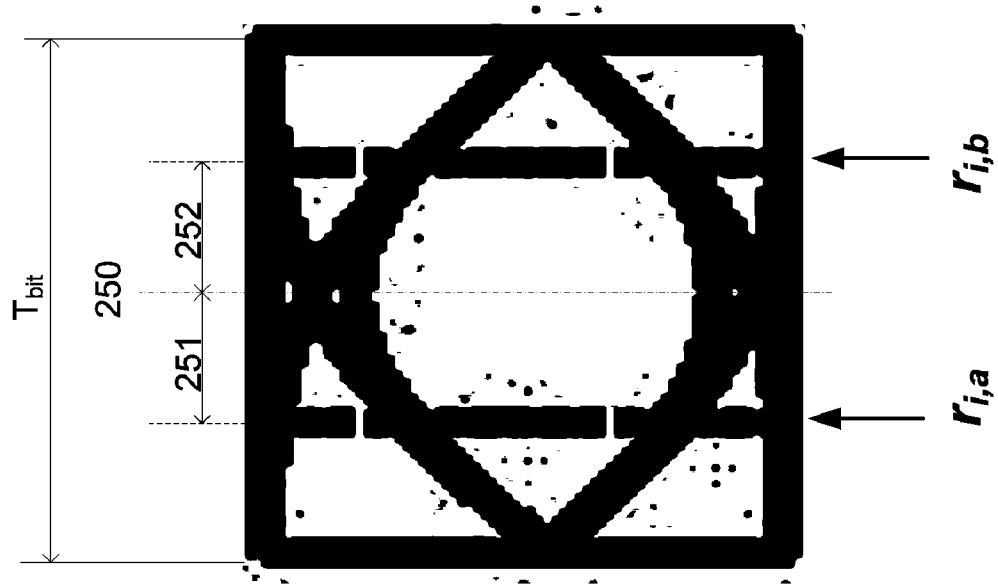
FIGS. 2A and 2B are eye diagrams illustrating exemplary sampling instants for one and two samples per bit, respectively.
Figure 2A:
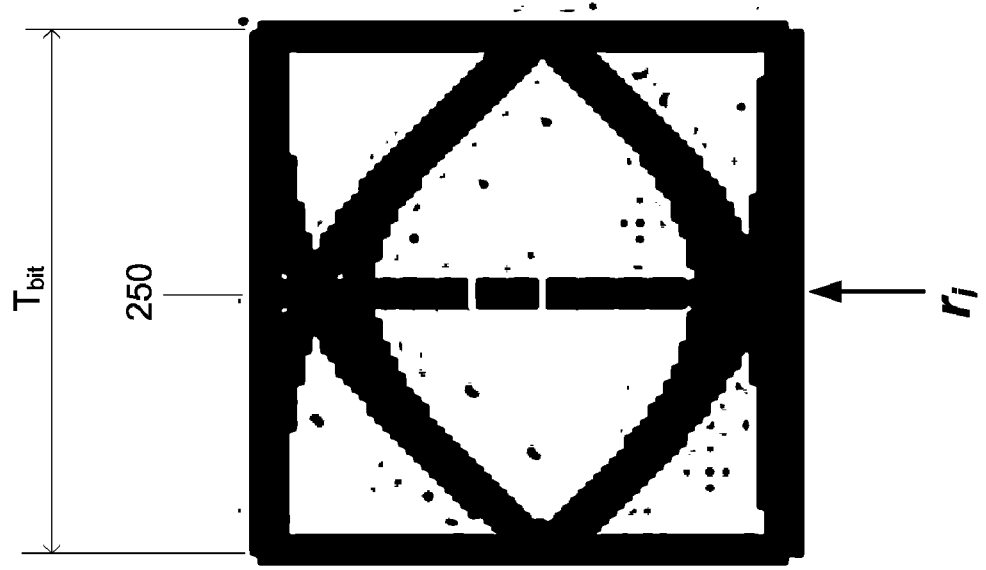

The filtered electrical signal is then sampled by a sampler 150 at the bit rate or at multiples thereof. FIGS. 2A and 2B show eye diagrams over one bit period $T_{bit}$ of the electrical signal at the input to the sampler 150. The maximum eye opening is designated by the line 250. Although shown at approximately the middle of the bit period, the maximum eye opening 250 can occur at other instances within the bit period.

FIG. 2A shows the case of a single sample, designated $r_i$, in which the sampling instant preferably substantially corresponds to the maximum eye opening 250 of each bit period.

FIG. 2B shows the two-sample case, in which the two sampling instants (yielding samples $r_{i,a}$ and $r_{i,b}$) are displaced about the maximum eye opening 250 of each bit period. The first sampling instance is displaced by a time period 251 before the maximum eye opening 250 and the second sampling instance is displaced by a time period 252 after the maximum eye opening 250. The time periods 251 and 252 may or may not be equal. In an exemplary embodiment, the maximum eye opening 250 is substantially at the middle of the bit period and the time periods 251 and 252 are substantially equal, each being 0-25% of the bit period $T_{bit}$. Note that where the time periods 251, 252 are between 0% and 25% of the bit period $T_{bit}$, this leads to an over-sampled MLSE receiver with unequal sample spacing. Note that in the presence of severe signal distortions, the eye may be fully closed. In that case, the samples are characterized by two not necessarily equal time periods denoting the spacing between two successive samples. Note also that the present invention may be generalized to more than two samples in a straightforward way.

The samples are then processed by a receiver 160. Where the optical-to-electrical converter 130 is a square law photo-detector, the samples would represent the absolute magnitude of the optical field and would be real quantities. (As can be appreciated by one of ordinary skill in the art, where a coherent receiver is used to perform the optical to electrical conversion, a first detector yielding the in-phase (real) part, and a second detector yielding the quadrature (imaginary) part of the optical field could be used, in which case, the receiver 160 would process complex samples.)

The receiver 160 comprises a maximum likelihood sequence estimation (MLSE) receiver, preferably a correlation-sensitive MLSE receiver. The detected data sequence, denoted ã1, ã2, ..., ãn, should match the original transmitted bit sequence â1, â2, ..., ân.

FIGS. 3A and 3B show the resulting OSNR performance of the correlation-sensitive MLSE receiver 160 with one and two samples per bit as a function of the bandwidth $B_o$ of the optical filter 125 for electrical filter 140 bandwidths $B_e$ of $0.75R_{bit}$ and $2R_{bit}$, respectively. Curves 300, 305, 310, 315, 320 and 325 are indicative of the performance of the correlation-sensitive MLSE receiver 160. For comparison, the curves 330 represent the OSNR performance of a threshold receiver using a de Brujin bit sequence (DBBS) and the curves 340 represent the OSNR performance of such a threshold receiver for a single pulse.

The curves 300-325 indicate the performance of the receiver 160 for various spacings of the samples from the maximum eye opening. Curve 300 corresponds to the case in which the samples are spaced 0% of the bit period from the maximum eye opening; in other words, the single-sample case illustrated in FIG. 2A. Curve 305 represents the case in which the samples are spaced 5% of the bit period from the maximum eye-opening; i.e., with reference to FIG. 3B, the time periods 251 and 252 are substantially equal to 5% of the bit period $T_{bit}$, leading to 10%/90% sampling intervals. Analogously, curves 310, 315, 320 and 325 represent the 10%, 15%, 20% and 25% spacing cases, respectively. The 25% case represented by curve 325 corresponds to uniform sampling at twice the bit rate, i.e. 50%/50% sampling intervals.

As shown in FIGS. 3A and 3B, for large optical filter bandwidths $B_o$, curves 305-325 are below curve 300 indicating that using two samples per bit, as opposed to one, improves the performance of the MLSE receiver (i.e., the receiver can provide the requisite bit error rate performance at a lower OSNR). As indicated by curves 305-325, moving the two samples away from the maximum eye opening gradually improves performance, up to a point, as the second sample increasingly contains more new (uncorrelated) information. In other words, increasing the spacing between the two samples within a bit initially causes the samples to become less correlated, which improves MLSE performance.

As shown by FIGS. 3A and 3B, however, the optimum sampling spacing is not necessarily half the bit period (curves 325), where the samples are spaced apart the furthest (±25% from the maximum eye opening), and their correlation is minimum. This is because the "quality" of the individual samples degrades when the displacement from the optimum sampling instant at the maximum eye opening is increased beyond a certain point. This effect can be understood by considering the extreme case of a narrow return-to-zero (RZ) signal: sampling at ±25% of the bit period off the maximum eye opening would yield no useful data information at all, since all samples, even though largely uncorrelated, would be taken in between information-bearing signal pulses. This loss of useful information leads to a performance degradation of the MLSE receiver. The optimum spacing of the two sampling instants within a bit is thus given by trading off the gain due to reduced noise correlation between the samples with the loss due to reduced information content of the samples.

As can be seen from the wide optical bandwidth regions of FIGS. 3A and 3B, the performance of the MLSE receiver improves up to a sample spacing of approximately ±20% of the bit duration (curves 320), but degrades slightly for larger sample spacings of, e.g., ±25% (curves 325). Furthermore, as can be seen from FIG. 3B, the MLSE receiver with over-sampling can perform better (310-325) than a conventional threshold receiver with a single pulse (340).

With respect to the narrow optical bandwidth regions of FIGS. 3A and 3B, the smaller the optical and/or electrical filter bandwidths, the higher the correlation will be between adjacent samples. Thus, the MLSE receiver gains less new information by over-sampling in this regime, and the second effect, pertaining to the reduced information quality of the two samples, becomes more prevalent. Therefore, for optical filter bandwidths below approximately 0.8Rbit, the MLSE receiver with one sample/bit has a better OSNR performance (300) than the MLSE receiver with two samples/bit (305-325), and the performance of the MLSE receiver with two samples/bit degrades with increasing displacement of the two samples from the maximum eye opening.

Note that while the above-described embodiments address degradations through narrow-band optical filtering, the present invention also applies to other signal degradations, such as chromatic dispersion, polarization mode dispersion, and others.

It is understood that the above-described embodiments are illustrative of only a few of the possible specific embodiments which can represent applications of the present invention. Numerous and varied other arrangements can be made by those skilled in the art without departing from the spirit and scope of the invention.

What is claimed is:

1. An optical data communications receiving system comprising:
   a converter, the converter converting an optical data signal to an electrical data signal;
   a sampler, the sampler sampling the electrical data signal and generating at least two samples for each bit of the electrical data signal, wherein a sampling instant of each of the samples is optimized and displaced from a maximum eye opening of the electrical data signal by a portion of a bit period greater than 0% and less than 25%; and
   a receiver, the receiver generating a recreated data signal based on the samples of the electrical data signal, wherein the receiver includes a maximum likelihood sequence estimation (MLSE) receiver.

2. The system of claim 1, wherein the sampling instants of the samples are selected to reduce the optical signal to noise ratio (OSNR) required for a predetermined bit error rate.

3. The system of claim 1, comprising an electrical filter for filtering the electrical data signal.

4. The system of claim 1, wherein the sampling instants of the samples are arranged symmetrically about a maximum eye opening of the electrical data signal.

5. The system of claim 1, wherein the sampling instant of each of the samples is displaced from the maximum eye opening of the electrical data signal by a portion of the bit period which is substantially 20%.

6. The system of claim 1 comprising an optical filter for filtering the optical data signal and wherein the displacement of the sampling instants from the maximum eye opening is selected in accordance with a bandwidth of the optical filter.

7. The system of claim 6, wherein the bandwidth of the optical filter is between 0.5 and 2.5 times the bit rate of the optical data signal.

8. The system of claim 1, wherein the optical data signal has an on-off-keying, non return-to-zero format.

9. The system of claim 1, wherein the converter includes a square-law photodetector and the samples represent a magnitude of the electrical data signal.

10. The system of claim 1, wherein the MLSE receiver is correlation-insensitive.

11. The system of claim 1, wherein the MLSE receiver is correlation-sensitive.

12. An optical data communications receiving method comprising steps of:
  receiving an optical data signal;
  converting the optical data signal to an electrical data signal;
  sampling the electrical data signal and generating at least two samples for each bit of the electrical data signal, wherein a sampling instant of each of the samples is optimized and displaced from a maximum eye opening of the electrical data signal by a portion of a bit period greater than 0% and less than 25%; and
  generating a recreated data signal based on the samples of the electrical data signal, wherein the step of generating the recreated data signal includes performing a maximum likelihood sequence estimation (MLSE).

13. The method of claim 12, wherein the sampling instants of the samples are selected to reduce the optical signal to noise ratio (OSNR) required for a predetermined bit error rate.

14. The method of claim 12, comprising electrically filtering the electrical data signal.

15. The method of claim 12, wherein the sampling instants of the samples are arranged symmetrically about a maximum eye opening of the electrical data signal.

16. The method of claim 12, wherein the sampling instant of each of the samples is displaced from the maximum eye opening of the electrical data signal by a portion of the bit period which is substantially 20%.

17. The method of claim 12, comprising optically filtering the optical data signal, wherein the displacement of the sampling instants from the maximum eye opening is selected in accordance with a bandwidth of the optical filtering.

18. The method of claim 17, wherein the bandwidth of the optical filtering is between 0.5 and 2.5 times the bit rate of the optical data signal.

19. The method of claim 12, wherein the optical data signal has an on-off-keying, non return-to-zero format.

20. The method of claim 12, wherein the converting step includes performing a square-law photodetection and the samples represent a magnitude of the electrical data signal.

21. The method of claim 12, wherein the MLSE is correlation-insensitive.

22. The method of claim 12, wherein the MLSE is correlation-sensitive.

* * * * *